United States Patent [19]

McClure et al.

[11] 4,251,426

[45] Feb. 17, 1981

[54] EPOXY RESIN POWDER PRIMER COMPOSITIONS

[75] Inventors: George R. McClure, Claymont, Del.; Claus Victorius, Media, Pa.

[73] Assignee: E. I. Du Pont de Nemours and Company, Wilmington, Del.

[21] Appl. No.: 10,263

[22] Filed: Feb. 6, 1979

[51] Int. Cl.³ .................. C08L 63/02; C08G 59/14
[52] U.S. Cl. ................... 260/37 EP; 260/13; 525/109; 525/524; 525/476; 525/934; 528/103
[58] Field of Search ............. 260/830 TW, 37 EP; 528/103; 525/109, 524

[56] References Cited

U.S. PATENT DOCUMENTS

| | | | |
|---|---|---|---|
| 3,269,974 | 8/1966 | Childs | 260/830 TW |
| 3,321,438 | 5/1967 | Brooker | 260/830 TW |
| 3,484,398 | 12/1969 | Childs | 260/830 TW |
| 3,647,726 | 3/1972 | Ulmer | 260/830 TW |
| 3,842,035 | 10/1974 | Klaren | 528/103 |
| 4,009,223 | 2/1977 | Nonnan | 260/830 TW |
| 4,040,993 | 8/1977 | Elbling | 260/830 TW |
| 4,122,060 | 10/1978 | Yallourakis | 260/830 TW |
| 4,186,036 | 1/1980 | Elms | 528/103 |

OTHER PUBLICATIONS

"New Generation Hardener Designed for Powder Coatings," Dow Chemical Company, Mar. 7, 1975.

*Primary Examiner*—Paul Lieberman

[57] ABSTRACT

Epoxy-resin powder primer compositions for metal substrates which have good flow, corrosion resistance, and adhesion to lacquer overcoats are provided by blending two epichlorohydrin-bisphenol-A epoxy resins with a curing agent. One of the epoxy resins can be extended with phenol to increase its flow properties. The curing agent is a hydroxy-containing mixed aromatic-aliphatic polyether resin.

9 Claims, No Drawings

EPOXY RESIN POWDER PRIMER COMPOSITIONS

BACKGROUND OF THE INVENTION

1. Field of the Invention

This invention is related to thermosetting powder coating compositions and particularly to epoxy-based compositions that are useful to prime substrates in preparation for the application of a topcoat.

2. Description of the Prior Art

Primers are widely used in preparation for the topcoating of metal or steel substrates to form a smooth surface over which the topcoat is applied. Epoxy-based primer compositions have been used since it is generally known that epoxides give better corrosion resistance and chip resistance than, for example, most alkyd resin primers. Epoxy-based primers of the past, however, have not adhered well to lacquer topcoats which are popular as automotive finishes.

With the current emphasis on reduction of solvent emissions, the use of powder-coating compositions, including primers, which contain no solvent, has gained in popularity. Many powder coatings, however, require unacceptable high temperatures, and therefore high energy consumption, to cure. Many of those powder formulations that can be cured at lower temperatures produce a coating that can lose adhesion. Therefore, there remains a need for a powder coating composition that not only cures rapidly at commercially-acceptable temperatures but also exhibits good adhesion to lacquer topcoats and resistance to corrosion and chipping.

SUMMARY OF THE INVENTION

According to the present invention, there is provided a thermosetting powder coating composition which consists essentially of finely divided particles at least 90 percent by weight of which have a maximum particle size not exceeding 100 microns. The particles are a blend of a composition of:

(A) 30-45 parts by weight of an epoxy resin of the formula

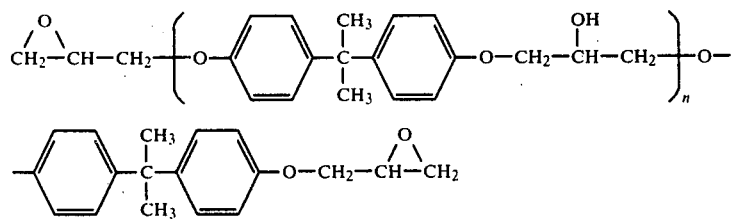

where n is sufficiently large to provide a resin having a Gardner-Holdt viscosity of O-S and an epoxide equivalent weight of 700-850;

(B) 18-40 parts by weight of (1) an epoxy resin of the general formula of (A) having a Gardner-Holdt viscosity of H-L and an epoxide equivalent weight of 575-700, or (2) a phenol-modified epoxy resin which is a resin of the general formula of (A) which has been modified with bisphenol-A and phenol to provide a phenol-modified epoxy resin having an epoxide equivalent weight of 550-675, or mixtures of (1) and (2);

(C) 15-30 parts by weight of a resinous curing agent consisting essentially of:

(1) a mixture of compounds of the general formula

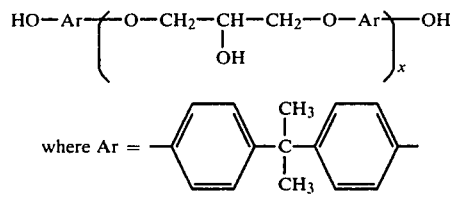

and where x is 0 or a positive number providing a mixture of compounds having an equivalent weight of 200-1000, and (2) 0.2-5.0 percent by weight, based on the weight of (1), of an accelerator which is a mono or dialkyl imidazole, dialkyl amino methyl phenol, or mixtures of these;

(D) 0.3-2.5 parts by weight, per 100 parts of (A), (B), and (C), of a tertiary amine; and (E) 0.1-5.0 parts by weight, per 100 parts of (A), (B), and (C), of a flow control agent selected from the group consisting of polyalkyl acrylates polyalkyl methacrylates, fluorinated esters of polyethylene glycol, fluorinated esters of polypropylene glycol, ethyl cellulose, silicones, and mixtures of these.

DESCRIPTION OF THE INVENTION

The coating composition of this invention is in the form of finely-divided powder particles at least 90 percent by weight of which do not exceed 100 microns in maximum dimension and preferably do not exceed 80 microns. In one particularly preferred formulation, the particles all have been passed through a standard 200-mesh screen (75 microns).

Exclusive of pigments and other nonreactive components, the film-forming components of the present invention are epoxy resins and a hydroxy-containing mixed aromatic-aliphatic polyether curing agent.

About 30-45 parts by weight, and preferably 35-40 parts by weight, of the powder coating composition are an epoxy resin which is of the epichlorohydrin-bisphenol-A kind, of the formula

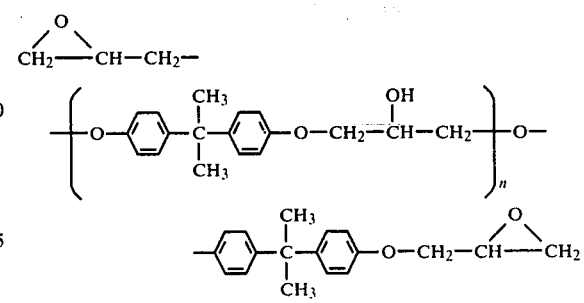

where n is sufficiently large to provide a Gardner-Holdt viscosity of O-S and an epoxide equivalent weight of 700-850. As used herein, the epoxide equivalent weight is the weight in grams of epoxy resin that contains one gram equivalent of epoxide, and the Gardner-Holdt viscosity is measured at 40 percent polymer solids in diethylene glycol mono-butyl ether at 25° C.

Other epoxy resins constitute 18-40 parts by weight, preferably 24-36 parts by weight of the present invention. These resins can be either (1) an epichlorohydrin-bisphenol-A resin of the general formula shown above having a Gardner-Holdt viscosity of H-L and an epoxide equivalent weight of 575-700, or (2) a phenol-modified epoxy resin, having an epoxide equivalent weight of 550-675, which is an epoxy resin of the epichlorohydrin-bisphenol-A kind which has been further reacted with phenol and bisphenol-A. Mixtures of these two resins can also be used.

In the production of phenol-modified epoxy resins, by varying the epoxide equivalent weight of the initial epichlorohydrin-bisphenol-A epoxy resin and the weight ratios of the reactants, the viscosity, epoxide equivalent weight, and reactivity of the resultant resin can be varied. A preferred phenol-modified epoxy resin has an epoxide equivalent weight of 550-675 and a viscosity (ASTM-D445) of 3500-7000 centistokes at 120° C.

One such preferred resin is prepared by reacting an epichlorohydrin-bisphenol-A epoxy resin, having an epoxide equivalent weight of 180-192, with bisphenol-A and phenol in an epoxy-resin/bisphenol-A/phenol equivalent-weight ratio of 1.82/1.0/0.5 to provide a phenol-modified epoxy resin having an epoxide equivalent weight of 590-630.

In addition to the epoxy resins described above, another film-forming component of the present coating composition is a resinous curing agent. About 15-30 parts by weight of the curing agent are used in the composition. The curing agent consists essentially of:

1. a mixture of compounds of the general formula

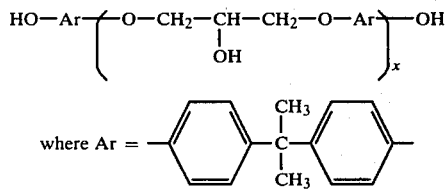

and x is 0 or a positive number, providing a mixture of compounds having an equivalent weight of 200-1000; and 2. 0.1-5.0 percent by weight, based on the weight of 1, of an accelerator which is a mono or di-alkyl imidazole, a dialkyl amino methyl phenol, or mixtures of these.

Preferred imidazoles for use in the curing agent are those in which the alkyl groups have 1-4 carbon atoms. Most preferred are methyl and ethylimidazole. Also preferred for use in the curing agent are dimethyl amino methyl phenol and tris-dimethyl amino methyl phenol.

The composition also includes flow control agents in an amount ranging from 0.1-5.0% by weight, based on the weight of the film-forming components. In general, the flow control agent should be a polymer having a number-average molecular weight of about 1000-20,000. Typically useful flow control agents are polyalkyl acrylates and methacrylates (a suitable example of which is Modaflow ®, available from Monsanto Company), and fluorinated polymers such as esters of polyethylene glycol or polypropylene glycol (a suitable example of which is "Fluorad", available from the 3M Company). Ethyl cellulose or silicones such as dimethyl polysiloxane or methyl phenyl polysiloxane can also be used.

About 0.3-2.5% by weight, based on the weight of the film-forming components, of the composition is a tertiary amine of the general formula

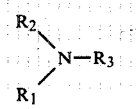

wherein $R_1$, $R_2$, and $R_3$ are the same or different alkyl or hydroxyalkyl radicals having 1-6 carbon atoms. The presence of the tertiary amine is especially useful to make the coating resistant to chemical attack by flue gas in instances when the coating is cured in a gas-fired oven.

To improve sanding properties of the coating, the composition can contain from 0.01-60% by weight, based on the weight of the film-forming constituents, of filler particles. Conventional particulate fillers that can be used are talc, silica, barium sulfate, calcium carbonate, aluminum silicate, mica, and the like. Preferably, the filler particles have a maximum dimension of 20 microns.

The composition can be pigmented, containing up to 100% by weight, based on the weight of the film-forming components, of pigment. Any conventional organic or inorganic pigments can be used. Examples are carbon black; metallic oxides such as titanium dioxide, zinc oxide, iron oxide, and the like; metallic powder; and metal hydroxides.

One method for forming the powder coating composition is to blend the components together and then to pass the mixture through a conventional melt-extruder. The extrudate is cooled and can then be reduced to a powder using conventional grinding equipment. After grinding, the powder is passed through a standard mesh screen to remove large particles. Preferably, a sieve that eliminates particles having maximum particle size greater than 100 microns is used.

The powder primer of this invention can be applied directly to a metal or steel substrate or to one which has been pre-primed with, for example, a conventional cathodic or anodic electrodeposition primer. Application can be by using electrostatic spraying techniques or by using a fluidized bed which can be electrostatic. The preferable method is electrostatic spraying in which, for example, a voltage of 20-100 kilovolts is applied to the spray gun. The composition can be applied either in one pass or in several passes to provide variable thicknesses, after cure, of 20-100 microns, preferably 20-50 microns. The substrate to be coated can, optionally, be heated to any temperature up to 175° C. prior to the application of the powder. Preheating the article provides better powder deposition and allows a more uniform coating.

After the application of the powder, the powder-covered article is heated at 135°-210° C. for 5-45 minutes to fuse and to cure the powder particles into a substantially continuous, uniform film. The quality of the film might be affected by the temperature of the cure and the percentage of the accelerator present in the curing agent in that curing temperatures in the high end of the indicated range can sometimes reduce the flow properties of the coating when the weight percentage of accelerator in the curing agent exceeds 1.6%.

The powder coating composition of this invention is generally useful as a high quality surface-treatment for substrates of various kinds, but is particularly useful as a primer for automotive bodies since it provides excellent corrosion resistance and interlayer adhesion between the substrate and topcoat. The enhanced interlayer adhesion is especially evident when the topcoat is an acrylic solution or dispersion lacquer, or a powder enamel. Epoxy primers, which generally adhere well to liquid enamel topcoats, have heretofore exhibited normally unacceptable adhesion to lacquer and powder enamel topcoats.

Before application of the topcoat, the primer coating can be sanded, but this is not necessary. One of the benefits of the present invention is that no sanding is required to promote adhesion to the topcoat.

The following examples illustrate the invention. In the examples, the components will be referred to according to the following numbering system:

(1) Epoxy resin having the formula

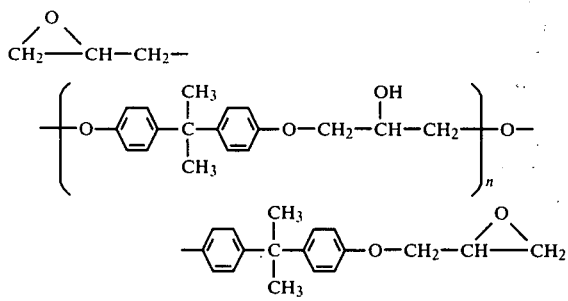

where n is sufficiently large to provide a resin having a Gardner-Holdt viscosity of O–S and an epoxide equivalent weight of 700–850.

(2) Phenol-modified epoxy resin which is an epoxy resin (epoxide equivalent weight 186–192) of the formula of (1) above reacted with bisphenol-A and phenol in an epoxy-resin/bisphenol-A/phenol equivalent-weight ratio of 1.82/1.0/0.5 to provide a phenol-modified epoxy resin having an epoxide equivalent weight of 590–630.

(3) Epoxy resin of the general formula of (1) above having a Gardner-Holdt viscosity of H-L and an epoxide equivalent weight of 575–700.

(4) Curing agent which is a combination of:
(a) a mixture of compounds of the general formula

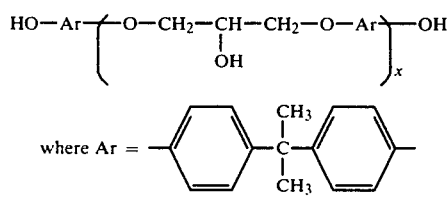

and x is 0 or a positive number, providing a mixture of compounds with an equivalent weight of 200–1000; and (b) 0.67% by weight, based on the weight of (a), of 2-methylimidazole.

EXAMPLE 1

The following components are blended as described:

|  | Parts by Weight |
| --- | --- |
| Portion 1 |  |
| Component 1 | 38.4 |
| Component 2 | 25.6 |
| Component 4 | 20.7 |
| "Fluorad" (flow control agent) | 0.6 |
| Triethanol amine | 1.5 |
| Portion 2 |  |
| Talc particles, maximum diameter of 20 microns | 2.5 |
| Titanium dioxide pigment | 11.5 |
| Carblon black | 0.5 |

Portion 1 is charged into a Welex grinder-mixer and mixed for 30 seconds. Portion 2 is then added and mixing is continued for one minute. This blend is then charged into a melt extruder and extruded at 88°–94° C. The extrudate is chilled, broken into chips, and then charged into a grinding mill where it is ground to a fine powder. The powder is then passed through a standard 200-mesh screen to remove particles of maximum dimension greater than 75 microns.

The powder is sprayed as a primer onto 20-gauge Bonderite phosphatized panels using Ransburg electrostatic powder guns, and the coated panels are then heated in a gas-fired oven for approximately 45 minutes at 160°–170° C. The resultant cured film has a thickness of 25–35 microns and a Tukon Hardness of about 16 knoops.

The chip resistance of the primer film on the panels exceeds commercially-acceptable standards when measured at −18° C. using a QGR Gravelo-meter available from the Q Panel Company of Cleveland, Ohio.

Several of the primer-coated panels are scored to the metal with a nail and placed in a salt-spray cabinet where they are exposed to a mist of a solution of NaCl (5% by weight) in water for 336 hours at 38° C. After this time, the panels are removed, dried, and inspected. There is no face corrosion on the primer film and no creepage of the film from the score line.

Several more of the primer-coated panels are topcoated with a conventional white-pigmented automotive acrylic lacquer finish. Both solution and dispersion lacquers are used. After the top-coat is baked, providing a top-coat film of approximately 60-micron thickness, the coatings of these panels are tested for chip resistance as described above. The chip resistance exceeds commercially-acceptable standards, indicating excellent flexibility and interlayer adhesion provided by the primer film. These same panels are then subjected to the salt-spray test as described above, after which the chip resistance of the coatings of these panels is again tested. There is no decline in the chip resistance.

EXAMPLE 2

The following components are blended as described:

|  | Parts by Weight |
| --- | --- |
| Component 1 | 40 |
| Component 3 | 35 |
| Component 4 | 24.4 |
| Modaflow ® | 0.6 |

| | Parts by Weight |
|---|---|
| Triethanol amine | 1.5 |
| Talc particles, maximum diameter 20 microns | 3.0 |
| Titanium dioxide pigment | 13.5 |
| Carbon black | 0.6 |

The components are charged into a Welex grinder-mixer and mixed for 60 seconds. The mix is then charged into a melt extruder and extruded at 88°–94° C. The extrudate is chilled, broken into chips, and then charged into a grinding mill where it is ground to a fine powder. The powder is then passed through a standard 270-mesh screen to remove particles larger than about 50 microns.

As in Example 1, the powder is sprayed onto 20-gauge Bonderite phosphotized panels and baked to yield a cured film with a thickness of 25–35 microns and a Tukon Hardness of about 16 knoops.

Testing as in Example 1 would expectedly show excellent corrosion resistance and commercially acceptable chip resistance.

We claim:

1. A thermosetting powder coating composition consisting essentially of finely-divided particles at least 90 percent by weight of which have a maximum particle size not exceeding 100 microns wherein the particles are a blend of (A) 30–45 parts by weight of an epoxy resin of the formula

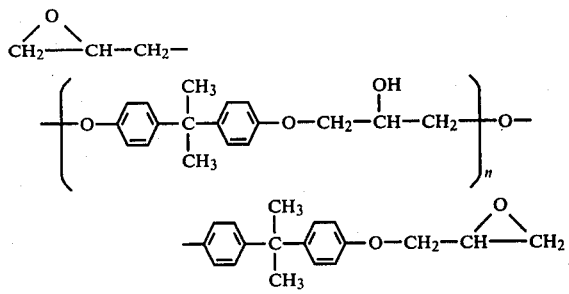

where n is sufficiently large to provide a resin having a Gardner-Holdt viscosity of O–S and an epoxide equivalent weight of 700–850;

(B) 18–40 parts by weight of a phenol-modified epoxy resin which is a resin of the general formula of (A) which has been modified with bisphenol-A and phenol to provide a phenol-modified epoxy resin having an epoxide equivalent weight of 550–675;

(C) 15–30 parts by weight of a resinous curing agent consisting essentially of:

(1) a mixture of compounds of the general formula

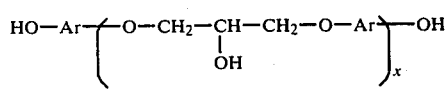

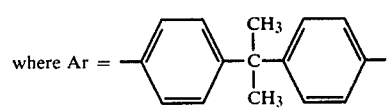

and where x is O or a positive number providing a mixture of compounds having an equivalent weight of 200–1000, and (2) 0.2–5.0 percent by weight, based on the weight of (1), of an accelerator which is a mono or dialkyl imidazole, dialkyl amino methyl phenol, or mixtures of these;

(D) 0.3–2.5 parts by weight, per 100 parts of (A), (B), and (C), of a tertiary amine; and (E) 0.1–5.0 parts by weight, per 100 parts of (A), (B), and (C), of a flow control agent selected from the group consisting of polyalkyl acrylates polyalkyl methacrylates, fluorinated esters of polyethylene glycol, fluorinated esters of polypropylene glycol, ethyl cellulose, silicones, and mixtures of these.

2. The powder coating composition of claim 1 wherein there are 35–40 parts by weight of (A), and 24–36 parts by weight of (B).

3. The powder coating composition of claim 2 wherein: there are 38–40 parts by weight of (A); 25–27 parts by weight of (B); 19–21 parts by weight of (C); the accelerator is 2-methylimidazole; and the tertiary amine is triethanol amine.

4. The powder coating composition of claim 1, 2, or 3 additionally containing pigment in an amount up to 100 percent of the weight of (A), (B), and (C).

5. The powder coating composition of claim 1, 2, or 3 additionally containing from 0.01–60 percent by weight, based on the weight of (A), (B), and (C), of filler particles.

6. A substrate coated with the composition of claim 1, 2, or 3.

7. A thermosetting powder coating composition consisting essentially of finely-divided particles at least 90 percent by weight of which have a maximum particle size not exceeding 100 microns wherein the particles are a blend of:

(A) 38–40 parts by weight of an epoxy resin of the formula

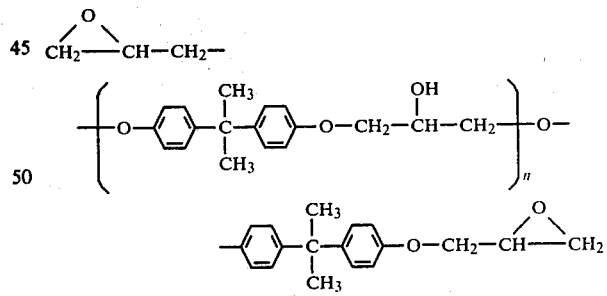

where n is sufficiently large to provide a resin having a Gardner-Holdt viscosity of O–S and an epoxide equivalent weight of 700–850;

(B) 25–27 parts by weight of a phenol-modified epoxy resin which is a resin of the general formula of (A) which has been modified with bisphenol-A and phenol to provide a resin having an epoxide equivalent weight of 590–630;

(C) 19–21 parts by weight of a resinous curing agent consisting essentially of (1) a mixture of compounds of the general formula

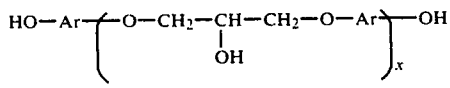

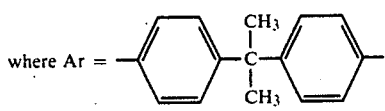

and where x is O or a positive number, providing a mixture of compounds with an equivalent weight of 200–1000, and (2) 0.5–0.7 percent by weight, based on the weight of (1), of 2-methylimidazole;

(D) 0.4–0.8 parts by weight of a flow control agent selected from the group consisting of fluorinated polyethylene glycol esters, fluorinated polypropylene glycol esters, and mixtures of these;

(E) 1–2 parts by weight of triethanol amine; and (F) 1–3 parts by weight of filler particles selected from the group consisting of talc, silica, barium sulfate, calcium carbonate, mica, and mixtures of these.

8. The powder coating composition of claim 7 additionally containing pigment in an amount up to 100 percent of the weight of (A), (B), and (C).

9. A substrate coated with the composition of claim 7 or 8.

* * * * *

UNITED STATES PATENT OFFICE
CERTIFICATE OF CORRECTION

PATENT NO. : 4,251,426
DATED : February 17, 1981
INVENTOR(S) : George R. McClure and Claus Victorius It is certified that error appears in the above-identified patent and that said Letters Patent are hereby corrected as shown below:

Claim 1. (Corrected) A thermosetting powder coating composition [consisting essentially] of finely-divided particles at least 90 percent by weight of which have a maximum particle size not exceeding 100 microns wherein the particles are a blend consisting essentially of (A) 30-45 parts by weight of an epoxy resin of the formula

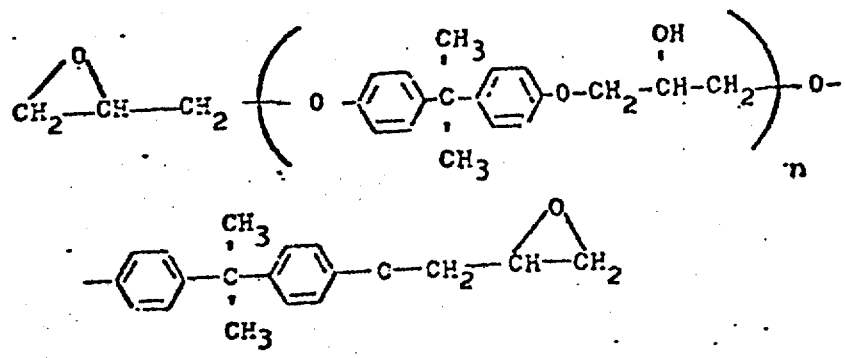

where n is sufficiently large to provide a resin having a Gardner-Holdt viscosity of O-S and an epoxide equivalent weight of 700-850;

(B) 18-40 parts by weight of a phenol-modified epoxy resin of epoxide equivalent weight of 590-630 which is [a resin of the general formula of (A) which has been modified with bisphenol-A and phenol to provide a phenol-modified epoxy resin having an epoxide equivalent weight of 550-675] the reaction product of an epichlorohydrin-bisphenol-A epoxy resin of epoxide equivalent weight 180-192, bisphenol-A, and phenol in an epoxy-resin/bisphenol-A/phenol equivalent weight ratio of 1.82/1.0/0.5,

UNITED STATES PATENT OFFICE
CERTIFICATE OF CORRECTION

PATENT NO. : 4,251,426
DATED : February 17, 1981
INVENTOR(S) : George R. McClure and Claus Victorius It is certified that error appears in the above-identified patent and that said Letters Patent are hereby corrected as shown below:

(C) 15-30 parts by weight of a resinous curing agent consisting essentially of:
(1) a mixture of compounds of the general formula

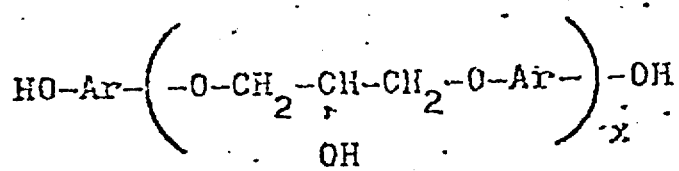

where Ar =

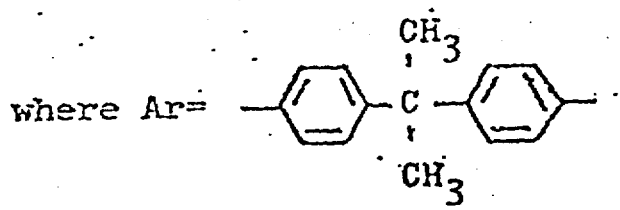

and where x is 0 or a positive number providing a mixture of compounds having an equivalent weight of 200-1000, and
(2) 0.2-5.0 percent by weight, based on the weight of (1), of an accelerator which is a mono or dialkyl imidazole, dialkyl amino methyl phenol, or mixtures of these;
(D) 0.3-2.5 parts by weight, per 100 parts of (A), (B), and (C), of a tertiary amine of the general formula

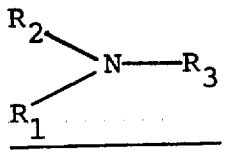

UNITED STATES PATENT OFFICE
CERTIFICATE OF CORRECTION

PATENT NO. : 4,251,426
DATED : February 17, 1981
INVENTOR(S) : George R. McClure and Claus Victorius It is certified that error appears in the above-identified patent and that said Letters Patent are hereby corrected as shown below:

wherein $R_1$, $R_2$, and $R_3$ are the same or different alkyl or hydroxyalkyl radicals having 1-6 carbon atoms; and (E) 0.1-5.0 parts by weight, per 100 parts of (A), (B), and (C), of a flow control agent selected from the group consisting of polyalkyl acrylates, polyalkyl methacrylates, fluorinated esters of polyethylene glycol, fluorinated esters of polypropylene glycol, ethyl cellulose, silicones, and mixtures of these.

Claim 7. (Corrected) A thermosetting powder coating composition [consisting essentially] of finely-divided particles at least 90 percent by weight of which have a maximum particle size not exceeding 100 microns wherein the particles of a blend consisting essentially of:

(A) 38-40 parts by weight of an epoxy resin of the formula

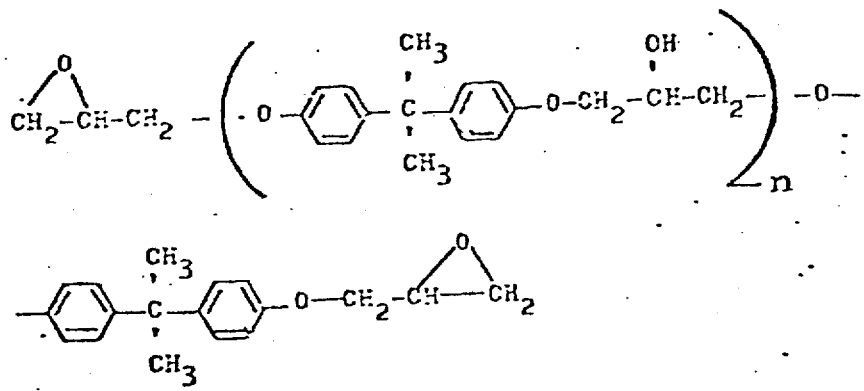

where n is sufficiently large to provide a resin having a Gardner-Holdt viscosity of O-S and an epoxide equivalent weight of 700-850;

UNITED STATES PATENT OFFICE
CERTIFICATE OF CORRECTION

PATENT NO. : 4,251,426
DATED : February 17, 1981
INVENTOR(S) : George R. McClure and Claus Victorius It is certified that error appears in the above-identified patent and that said Letters Patent are hereby corrected as shown below:

(B) 25-57 parts by weight of a phenol-modified epoxy resin of epoxide equivalent weight 590-630 [which is a resin of the general formula of (A) which has been modified with bisphenol-A and phenol to provide a resin having an epoxide equivalent weight of 590-630] which is the reaction product of an epichlorohydrin-bisphenol-A epoxy resin of epoxide equivalent weight 180-192, bisphenol-A, and phenol in an epoxy-resin/bisphenol-A/phenol equivalent weight ratio of 1.82/1.0/0.5;

(C) 19-21 parts by weight of a resinous curing agent consisting essentially of
(1) a mixture of compounds of the general formula

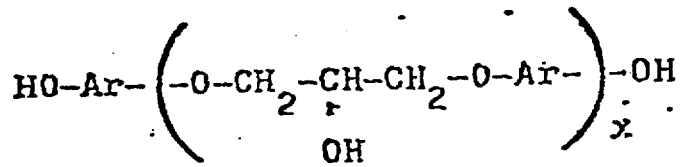

where Ar =

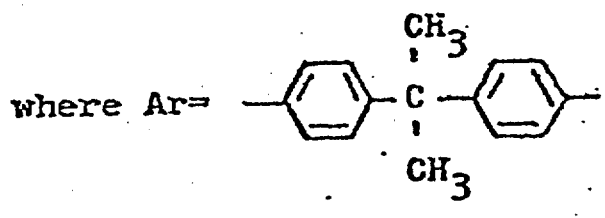

and where x is 0 or a positive number, providing a mixture of compounds with an equivalent weight of 200-1000, and
(2) 0.5-0.7 percent by weight, based on the weight of (1), of 2-methylimidazole;

UNITED STATES PATENT OFFICE
CERTIFICATE OF CORRECTION

PATENT NO. : 4,251,426

DATED : February 17, 1981

INVENTOR(S) : George R. McClure and Claus Victorius

It is certified that error appears in the above-identified patent and that said Letters Patent are hereby corrected as shown below:

(D) 0.4-0.8 parts by weight of a flow control agent selected from the group consisting of fluorinated polyethylene glycol esters, fluorinated polypropylene glycol esters, and mixtures of these;

(E) 1-2 parts by weight of triethanol amine; and (F) 1-3 parts by weight of filler particles selected from the group consisting of talc, silica, barium sulfate, calcium carbonate, mica, and mixtures of these.

Signed and Sealed this

Twenty-sixth Day of January 1982

[SEAL]

Attest:

GERALD J. MOSSINGHOFF

Attesting Officer     Commissioner of Patents and Trademarks